3,265,581
PROCESS OF PURIFYING INTERFERON WITH ALUMINO-SILICATE ADSORBENTS
Karl Heinz Fantes, Bushey, and Cecil Francis O'Neill, Slough, England, assignors to Glaxo Laboratories Limited, Greenford, England, a British company
No Drawing. Filed Aug. 2, 1963, Ser. No. 299,463
Claims priority, application Great Britain, Aug. 16, 1962, 31,502/62; July 26, 1963, 31,502/63
7 Claims. (Cl. 167—78)

This invention is concerned with improvements in or relating to the production of the non-specific antiviral substance, interferon.

Interferon is the name given to a non-specific antiviral material which may be obtained from cells and extra-cellular fluids, and much experimental work has been carried out on this material (D. C. Burke, Biochem. J. 78 (3), 556, 1961; V. Mayer et al., Acta Vir. 5, 130, 1961; J. Porterfield, Lancet, Dec. 9, 1959, 326; R. Pollikoff, Bact. Proc. (61st meeting) 56, 158, 1961; J. Zemla and J. Vlcek, Acta Vir. 5, 129, 1961; A. Isaacs, Virus Growth & Variation (9th Symposium of the Soc. for Gen. Microbiol., Cambridge Univ. Press, 1959, p. 102); R. Wagner Bact. Rev. 24 (1), 151, 1960; Isaacs, A., and Lindemann, J.. Proc. Roy. Sos. B, 147, 258, 1957; E. De Mayer and J. F. Enders, Proc. Soc., Expt 1, Biol. Med. 107 (3), 573, 1961). When living cells are contacted with living, attenuated or partially inactivated virus they are stimulated to produce such antiviral material which may be liberated into the extra-cellular fluid and can be isolated in varying degrees of purity. The interferon so produced appears to be generally non-specific in its power to give protection against other viruses in addition to the one which is used to stimulate the cells although differences in sensitivity to interferon are observed between different viruses. However, interferon is usually found to give better protection to tissues and cells of the kind from which it is produced than to other tissues and cells.

The interferon is normally associated with a number of other water-soluble materials, notably proteins, and some degree of purification is preferable if the interferon is to be administered as a medicinal preparation, especially if parenteral administration is envisaged. The interferon is also frequently present at low concentrations, especially in solutions resulting from purification steps, and it is thus desirable to have a convenient method for its concentration.

It is an object of the present invention to provide an improved process for the purification and/or concentration of material containing interferon.

We have found that material containing interferon can be purified and/or concentrated by adsorption onto alumino silicates having a high ratio of silica to alumina ($SiO_2:Al_2O_3$) at acid pH and elution of the interferon therefrom.

According to the invention, therefore, we provide a process for the purification and/or concentration of material containing interferon which comprises adsorbing said interferon at a pH less than 6 from an aqueous medium onto alumino silicates having a high ratio of silica to alumina and subsequently eluting said interferon material therefrom by means of an aqueous solution of an electrolyte at a pH greater than 5.5.

The alumino silicate used in the present process should contain a high ratio of silica to alumina, for example a molar ratio of $SiO_2$ to $Al_2O_3$ greater than 5, in contrast to bentonite, kaolinite and similar adsorbents in which this ratio is from 2 to 4. Bentonite and kaolinite have been found to be unsuitable in their adsorption characteristics for use in the present process. The $SiO_2:Al_2O_3$ ratio is preferably greater than 7.

The particle size of the alumino-silicate adsorbent is also of importance and coarse material does not adsorb interferon sufficiently to be effective in batchwise operation although larger particle-size material can be used in columns. Thus, for example in a batchwise operation the substance Doucil (sold by J. Crosfield & Sons Ltd. of Warrington, Lancashire), gave good results at a particle size of 0 to $25\mu$ but was largely ineffective in the coarse state in which the average particle size was about 0.1–1.0 mm. The particle size for batchwise operation should generally be below $50\mu$ and particle sizes less than $25\mu$ are preferred; especially good results have been obtained with the material Alusil (J. Crosfield & Sons) at a particle size of 0.03 to $0.05\mu$ and even better results with Doucil at a particle size $0-25\mu$.

The alumino-silicate is also preferably synthetic material, which is usually in an amorphous form, rather than material obtained from natural sources which is usually crystalline.

It is especially preferred that the alumino-silicates should contain a proportion of an alkali metal, in combined form, preferably sodium. The alkali metal content, calculated in terms of the weight ratio of alkali metal oxide to alumina, is preferably between 1:3 and 3:1, advantageously between 2:5 and 1:1.

Table I below gives an example of substances suitable for use as adsorbents in the batchwise operation of the present process, together with certain of their chemical and physical characteristics.

TABLE I

|  | Percent $SiO_2$ | Percent $Al_2O_3$ | Percent $Na_2O$ | $SiO_2/Al_2O_3$ Molar | $SiO_2/Al_2O_3$ By weight | Part. size ($\mu$) |
|---|---|---|---|---|---|---|
| Alusil (J. Crosfield & Sons) | 78 | 10 | 10 | 13 | 7.8 | 0.03–0.05. |
| Doucil-35 (Warrington Lancs.) | 75 | 17 | 8 | 7.5 | 4.4 | 0–25. |
| Al silicate (British Drug Houses) | 81 | 7 | 3 | 19.3 | 11.6 | Average 0.135 or less. |

The optimum pH at which adsorption of the interferon takes place depends upon the ionic concentration of the solution, upon the quantity of impurity present with the interferon and upon the quantity of alumino-silicate used. In general the smaller the quantity of alumino-silicate used the lower is the pH at which optimal adsorption can be achieved. When concentration is a principal object it will be preferable to reduce the amount of adsorbent so that the quantity of eluant may be minimized and for this purpose, low pH's are preferred. When concentration is not the principal object, larger quantities of alumino-silicate may be used and the pH may be somewhat higher. However, the optimal pH with a given quantity of alumino-silicate is also affected by the quantity of protein impurity present and where large quantities of protein are simultaneously adsorbed, the interferon is more easily removed at pH's nearer to 7.0 so that, for optimal adsorption the pH should be lower when more protein is present. The preferred pH range is 2–6 and pH's between 3 and 5 are particularly suitable. The ionic concentration of the adsorption solution is of importance since the concentration of electrolyte may be used to control the adsorption or desorption. At pH values above 5.0, the ionic concentration of the solution should be low e.g. not greatly above isotonic, since at pH 6.0, the interferon can actually be eluted by 0.7 M electrolyte solutions and at high ionic concentration adsorption at pH values above 5.0 would be inefficient.

The adsorption of the interferon may be achieved by adding the required amount of alumino-silicate to the interferon containing fluid to give a suitable alumino-silicate concentration. Various concentrations of alumino-silicate may be used for adsorption and, in general, more adsorbent is needed when higher quantities of protein are present. Conversely, when only small quantities of protein impurities are present, high concentrations of adsorbent cause such strong adsorption of the interferon that elution is rendered difficult. Where the protein concentration is of the order of 0.1 mg./ml., as is commonly found in interferon solutions obtained from monkey cells, the alumino-silicate concentration at a pH of about 4 is preferably below 2.0 mg./ml., for example within the range 0.2 to 0.6 mg./ml. Where about 1 mg./ml. of protein is present, the alumino-silicate concentration is preferably within the range of 4 to 10 mg./ml. Such higher protein concentrations are often found in interferon solutions obtained from egg allantoic fluid. In general, therefore, the weight ratio of adsorbent to protein in the liquid is preferably between 3 and 20, advantageously between 5 and 10.

Adsorption is conveniently effected by agitating the alumino-silicate in the interferon containing fluid until adsorption is complete, for example, about 2 hours.

Elution is preferably carried out at a pH not less than 6.0. Suitable eluants include alkaline aqueous solutions such as aqueous solutions of alkalis for example alkali-metal and alkaline-earth metal hydroxides, carbonates and bicarbonates, in particular sodium or potassium bicarbonate or carbonate. Buffered solutions are conveniently used as eluants and aqueous solutions of disodium or dipotassium hydrogen phosphate are particularly suitable. Preferred eluants include 0.2 M aqueous disodium hydrogen phosphate, which gives a final pH, when mixed with the adsorbent, of 7.5 and Earle's buffer (containing, for example, 2% sodium bicarbonate) which gives a final pH of 8.3–8.5. In general, the pH of the eluting solution may be lower if the ionic strength is increased and with ionic strengths of 0.7 M and over, the elution pH may be as low as 5.5. The ionic strength is preferably, however, below 2.0 M, and advantageously within the range 0.2 to 1.0 M. Elution may be carried out at a pH of as high as 10.5–11 but pH's above this are preferably avoided since damage to the interferon may then result. Substantially complete elution may be obtained using a smaller quantity of liquid as eluant than the quantity of liquid from which the interferon has been adsorbed, so that a concentration of activity is thereby achieved.

Elution may be carried out in any desired manner but we have found it convenient merely to add the alumino-silicate containing the adsorbed material to the eluant and allow the mixture to stand for a time sufficient to effect elution, for example from 0.1–2 hours, preferably from 0.5–1.0 hour. The elution may be facilitated by dispersion of the adsorbent in the eluant, for example by shaking, mixing or any other desired procedure.

After elution, the interferon may, if desired, be isolated from solution although it is also possible to use the solution resulting from the elution stage directly. Isolation may be effected for example, by freeze-drying or by precipitation preferably by a volatile precipitant such as a water-miscible organic liquid e.g. an alcohol, for example, methanol ethanol, etc. or a ketone, or example, acetone.

Where the electrolyte used in elution is desirable in the final product, e.g. where further purification steps requiring low salt concentration are intended, for example chromatography or cellulose ion exchangers, this should be removed, e.g. by dialysis etc. It is preferred to select an electrolyte, however, which is either able to sublime during freeze-drying or remains in solution when the interferon is precipitated. Ammonium formate, bicarbonate and carbonate are especially suitable as electrolytes which sublime during freeze-drying. The electrolytes soluble in the precipitation solution depend upon the nature of the precipitant but alkali metal acetates, e.g. sodium acetate, are especially suitable when acetone is used as precipitant.

The process according to the invention can be applied in the production of interferon from any type of cell stimulated by virus, for example, avian cells such as egg choriollantoic membrane cells or whole chick embryos stimulated by influenza virus, Newcastle disease, fowl plague, etc. or mammalian cells such as monkey kidney, human amnion cells or even cell-lines infected with these and other viruses. The culture of such living materials and the optimum conditions required are well known in the art Ho M, and Enders, J. F., Proc. Nat. Acad. Sci. 45/3, 385, 1959 (human kidney cells); Isaacs, A., and Hitchcock, C. Lancet Sept. 9, 1960, p. 9 (lungs from infected mice); De Mayer, E., and Enders, J. F., Proc. Soc. Exptl. Biol. Med. 107 (3), 573, 1961 (human amnion cells).

The process may be applied at any convenient stage in the purification of the interferon. Thus one may directly subject a virus/cell culture medium to the process according to the invention, preferably after removal of tissues or cell debris, to achieve a concentration and purification of the interferon. One may also apply the process according to the invention, to the interferon containing liquid which has been partly purified by other means, e.g. selective precipitation of protein, for example, with ammonium sulphate, dialysis etc. whereby concentration and in some cases further purification of the interferon may be achieved.

As indicated above in the purification of interferon one of the principal contaminants present in the virus-containing liquid is proteinaceous material derived from the animal cell substrate e.g. egg or kidney cell tissue, used for the culture of the virus. By the process according to the invention it is possible to achieve at least a partial separation of the interferon from such proteinaceous contaminants as the interferon is adsorbed onto and eluted from the alumino-silicate to a different degree than are the proteinaceous contaminants.

Thus, by operating within the preferred pH ranges and alumino-silicate concentrations specified above it is possible to achieve at least a degree of selective adsorption of the interferon compared with the proteinaceous contaminants; elution of the adsorbed material from the alumino-silicate under the conditions specified above can also lead to a further separation as the interferon is eluted from the adsorbent more readily than some of the proteinaceous contaminants. In fact, by suitable adjustment of the pH of adsorption and concentration of alumino-silicate and by suitable control of elution, both the adsorption and elution steps can be made to act selectively in favour of the separation (and therefore purification) of the interferon from the proteinaceous contaminants. The present process is however useful where concentration only is desired, for example to concentrate an interferon of low potency.

In order that the invention may be well understood the following examples are given by way of illustration only:

SOURCE OF INTERFERON (a) *Chick interferon.*—9–11 day old chick embryos are inoculated allantoically with a suitable dilution of an influenza virus (e.g. B/England, A/Melbourne, A/Singapore or Kunz; usually 0.5 ml. containing 100–500 hA. units). The eggs are then incubated at 37° for 48–72 hours, and then placed in a cold room to cool. The allantoic fluid is harvested and dialysed against pH 2.0 citrate buffer or acidified to pH 2 (with, for example, hydrochloric acid) and kept at 4° C. for about 16–24 hours. (This kills the virus and also destroys its haemagglutinating activity without affecting the interferon titer.) The fluid was then neutralized to pH 7.0–7.4 by adding N-NaOH or by dialysis against an appropriate buffer, and then served as the starting material for the experimental work. It is referred to herein as "crude interferon." The ionic concentration of the solution is approximately isotonic.

(b) *Monkey interferon.*—The culture fluid of a 7–10 day old monolayer of cynomolgus monkey kidney cells (in a Roux bottle) is changed for 100 ml. Parker's 199 medium containing a little additional $NaHCO_3$ (approx. 0.1%). This is then infected with 1 ml. Kunz virus (approx. 4000 hA. units); the cultures are then incubated at 37° for three days. The culture fluid which contains the interferon is then harvested, adjusted to pH 2 with HCl to kill the virus and reneutralized after 3–16 hours. The ionic concentration of the solution is approximately isotonic.

*Interferon assay.*—A plaque reduction assay according to the method of Isaacs et al., Lancet, Sept. 7, 1960, p. 69, was used. For chick interferon, chick embryo monolayers and Semliki forest virus were used; for monkey interferon, monkey kidney cells and M6 virus were used. For monkey kidney and chick interferon assay, a tube assay was sometimes used, the dilution of a sample which protected 50% of the cells from viral attack being a measure of the interferon content.

*Protein assay.*—The method of Lowry et al. (J.B.C., 193, 265, 1951), was used.

Example 1

Crude chick interferon was shaken with 10 mg./ml. Alusil at pH 3 for 2 hours. The supernatant was decanted after centrifugation, neutralized and assayed for protein and interferon.

To the Alusil-adsorbate, 0.1 M $Na_2HPO_4$ was added ($\frac{1}{10}$ the volume of the original crude interferon volume), which gave a final pH of 7.5, the suspension was shaken for 1 hour and then centrifuged. The alkaline supernatant (constituting a 10-fold concentrate by volume) was neutralized and diluted 10 times for protein and interferon assay.

Results are shown in Table II.

The figures show that the interferon activity was concentrated 10 times in good yield and that 66% of the extraneous protein was eliminated at the same time. Elution with 0.3 M $Na_2HPO_4$ gave similar results.

Example 2

Adsorption with 10 mg./ml. Alusil was carried out as in Example 1 but at pH 5.0. The Alusil-adsorbate was washed once by shaking with a small volume of Earle's buffer at pH 5, the washings were discarded after centrifuging. Elution of the interferon from the Alusil-adsorbate was performed at pH 8.3–8.5 with a mixture of 8 parts Earle's buffer and 2 parts of 10% aqueous $NaHCO_3$ using a volume equal to $\frac{1}{5}$ that of the original crude interferon. A sample of the eluate (i.e. 5 fold concentrate by volume) was diluted 5 times for protein and interferon assay.

The bulk of the eluate was once more treated with 10 mg./ml. Alusil at pH 5 in an identical manner. The final eluate (i.e. a 25 fold concentrate by volume of the starting fluid) was diluted 25 times and assayed for protein and interferon.

The results of this experiment are summarized in Table III.

TABLE III

|  | Interferon assay, percent reduction of plaques— Dilution of interferon | | | | Protein assay | |
| --- | --- | --- | --- | --- | --- | --- |
|  | $\frac{1}{32}$ | $\frac{1}{64}$ | $\frac{1}{128}$ | $\frac{1}{256}$ | µg./ml. | Percent |
| Crude interferon (starting material) | 83 | 73 | 42 | 27 | 990 | 100 |
| 5 fold concentrate (rediluted 5× for assay purposes) | 75 | 53 | 36 | 8 | 154 | 15.6 |
| 25 fold concentrate (rediluted 25× for assay purposes) | 71 | 50 | 29 | 6 | 55 | 5.6 |

Interferon was concentrated 25× by volume with an approximate recovery of 50–70%.

Only 5.6% of the original total protein was contained in the concentrate.

Example 3

0.4 mg./ml. micronized Doucil was added to 25 ml. monkey kidney interferon, the suspension was adjusted to pH 4 with HCl and shaken for 2 hours. After centrifuging the supernatant was decanted, neutralized and assayed. M phosphate buffer (pH 7.5, 5 ml.) was added to the sedimented adsorbate and the suspension shaken again for 2 hours and centrifuged. The decanted eluate was diluted to the original volume with 20 ml. of Earle's buffer and dialyzed against Earle's buffer before being assayed by the tube assay method. The results are shown in Table IV.

TABLE II

|  | Interferon assay, Percent reduction of plaques—Dilution of interferon | | | Protein assay | |
| --- | --- | --- | --- | --- | --- |
|  | $\frac{1}{4}$ | $\frac{1}{16}$ | $\frac{1}{64}$ | µg./ml. | Percent |
| Crude interferon (starting material) | 100 | 100 | 15 | 1,120 | 100 |
| Neutralized pH 3 supernatant | 0 | 5 | 0 | 20 | 2 |
| 0.1 M $Na_2HPO_4$ eluate (10 fold concentrate, but rediluted to original volume for assay) | 100 | 92 | 33 | 380 | 34 |

TABLE IV

|  | Volume, ml. | 50% protection at dilution | Approx. percent recovery | Protein | |
| --- | --- | --- | --- | --- | --- |
|  |  |  |  | µg./ml. | Percent |
| Starting fluid | 25 | $\frac{1}{32}$ | "100" | 74.5 | "100" |
| Spent supernatant | 25 | <$\frac{1}{2}$ | <25 | 7.3 | 10 |
| Eluate | [1] 5 | $\frac{1}{16}$ | 130 | 32.6 | 44 |

[1] Diluted to 25 ml.

The interferon was recovered quantitatively as a five fold concentrate; over half the extraneous protein was eliminated at the same time.

*Example 4*

Chick interferon was adsorbed by 5 mg./ml. Doucil at pH 4 in the usual way. The adsorbate was suspended in 0.5 M ammonium bicarbonate and a little ammonia to give a final pH of 8 using ⅕ the volume of the original interferon solution. The mixture was shaken for two hours and then centrifuged to remove the spent Doucil. A portion of the eluate was diluted 5-fold with Earle's buffer and assayed (after dialysis). The remainder was freeze-dried; the resulting salt-free solid was dissolved in Earle's buffer and assayed at a dilution which again corresponded to the original interferon volume. The results are shown in Table V.

TABLE V

|  | Percent reduction of plaque numbers at a dilution of— | | |
|---|---|---|---|
|  | ⅛ | 1/24 | 1/72 |
| (a) Starting fluid | 100 | 88 | 42 |
| (b) $NH_4HCO_3$ eluate | 100 | 71 | 26 |
| (c)(b) After freeze drying | 100 | 73 | 50 |

*Example 5*

Several monkey interferon portions were adsorbed by 0.4 mg./ml. Doucil at pH 4 in the usual way. The individual adsorbates were eluted with varying concentrations of $NH_4HCO_3$, $(NH_4)_2CO_3$ and $NH_4OCOH$ in the way described in the previous example. The eluates (after centrifugation and dialysis) were diluted 5-fold and assayed. The results are shown in Table VI.

TABLE VI

|  | 50% protection at a dilution of— | Approx. percent recovery |
|---|---|---|
| Starting fluid | 1/22 | "100" |
| Eluates: |  |  |
| 0.2 M $NH_4OOCH$ + $NH_4OH$ to pH 8 | ⅑ | 40 |
| 0.4 M $NH_4OOCH$ + $NH_4OH$ to pH 8 | 1/16 | 70 |
| 0.6 M $NH_4OOCH$ + $NH_4OH$ to pH 8 | 1/22 | 100 |
| 0.8 M $NH_4OOCH$ + $NH_4OH$ to pH 8 | 1/22 | 100 |
| 1.0 M $NH_4OOCH$ + $NH_4OH$ to pH 8 | 1/18 | 80 |
| 0.2 M $NH_4HCO_3$ + $NH_4OH$ to pH 8 | 1/27 | 120 |
| 0.4 M $NH_4HCO_3$ + $NH_4OH$ to pH 8 | 1/22 | 100 |
| 0.6 M $NH_4HCO_3$ + $NH_4OH$ to pH 8 | 1/27 | 120 |
| 0.8 M $NH_4HCO_3$ + $NH_4OH$ to pH 8 | 1/27 | 120 |
| 1.0 M $NH_4HCO_3$ + $NH_4OH$ to pH 8 | 1/22 | 100 |
| 0.2 M $(NH_4)_2CO_3$ [a] | ⅕ | 20 |
| 0.4 M $(NH_4)_2CO_3$ [a] | ⅙ | 40 |
| 0.6 M $(NH_4)_2CO_3$ [a] | ⅙ | 30 |
| 0.8 M $(NH_4)_2CO_3$ [a] | ⅙ | 30 |
| 1.0 M $(NH_4)_2CO_3$ [a] | 1/12 | 60 |

[a] pH was approx. 8.5 not adjusted.

*Example 6.—Adsorption of monkey interferon by 0.5 mg./ml. Doucil at various pH values*

Portions of monkey kidney interferon were adsorbed onto 0.5 mg./ml. Doucil at pH's 4, 5, 6, 7, 8, and 9 by shaking for 2 hours at room temperature. The mixtures were kept at 4° overnight and were then centrifuged. The supernatants were decanted, neutralized, dialyzed against Earle's buffer and assayed.

The Doucil-adsorbates were eluted by suspending in a mixture of Earle's buffer: 10% $NaHCO_3$ (4:1) using ⅕ the volume of the pre-adsorption samples. After shaking at room temperature for 2 hours, the mixtures were centrifuged and the decanted eluates were neutralized and dialyzed against Earle's buffer. Before assay the samples were diluted with 4 volumes of Earle's buffer, i.e. back to their pre-adsorption volumes. The results are shown in Table VII.

TABLE VII

|  | 50% protection at a dilution of— | Approx. percent interferon | μg./ml. protein | Percent protein |
|---|---|---|---|---|
| Starting fluid | 1/10 | "100" | 71 | "100" |
| Supernatant from pH 4 adsorption | <½ | <20 | 3 | 5 |
| Supernatant from pH 5 adsorption | <½ | <20 | 34 | 47 |
| Supernatant from pH 6 adsorption | ⅙ | 60 | 43 | 61 |
| Supernatant from pH 7 adsorption | 1/10 | 100 | 46 | 65 |
| Supernatant from pH 8 adsorption | 1/10 | 100 | 53 | 75 |
| Supernatant from pH 9 adsorption | 1/10 | 100 | 53 | 75 |
| Eluates after pH 4 adsorption* | 1/10 | 100 | 44 | 62 |
| Eluates after pH 5 adsorption* | 1/10 | 100 | 29 | 40 |
| Eluates after pH 6 adsorption* | ⅙ | 60 | 14 | 20 |
| Eluates after pH 7 adsorption* | <¼ | <40 | 7 | 10 |
| Eluates after pH 8 adsorption* | <½ | <20 | 1 | 2 |
| Eluates after pH 9 adsorption* | <¼ | <40 | 4 | 6 |

*These were five-fold concentrates but were rediluted to their original volumes for assay purposes.

Table VII shows that interferon was completely adsorbed at pH 4 and pH 5, and partly adsorbed at pH 6. No adsorption occurred at pH's 7–9. The results obtained on eluting the activity show that the recovery was complete from the pH 4 and pH 5 adsorptions, partial from the pH 6 sample; no interferon was recovered from pH 7–pH 9 adsorptions.

*Example 7.—The elution of monkey kidney interferon from Doucil-adsorbates at various pH's*

Several portions of monkey interferon were adsorbed onto 0.4 mg./ml. Doucil at pH 4 as described in Example 6. (The pH 4 supernatants were also treated as in Example 6.)

Elutions were carried out with 0.7 M buffers of pH's 3–8.8. For the elutions volumes of buffers corresponding to ⅕ of that of the starting material were used. The eluates were neutralized, dialyzed and rediluted for assay purposes as described in Example 6.

The results are shown in Table VIII.

TABLE VIII

|  | 50% protection at dilution of— | Percent interferon | Protein | |
|---|---|---|---|---|
|  |  |  | μg./ml. | Percent |
| Starting Fluid | 1/10 | "100" | 71 | 100 |
| Supernatant | ½ | <20 | 6 | 9 |
| Elution with 0.7 M acetate buffer pH 3 | ½ | <20 | 4 | 6 |
| Elution with 0.7 M acetate buffer pH 4 | ½ | <20 | 2 | 3 |
| Elution with 0.7 M acetate buffer pH 5 | ½ | <20 | 7 | 10 |
| Elution with 0.7 M phosphate buffer pH 6 | 8 | 80 | 36 | 51 |
| Elution with 0.7 M phosphate buffer pH 7 | 10 | 100 | 39 | 55 |
| Elution with 0.7 M phosphate buffer pH 8 | lost |  |  |  |
| Elution with 0.7 M $Na_2HPO_4$ buffer pH 8.8 | 12 | 120 | 33 | 45 |

The results show that although eluation even with a high molarity buffer is not possible at pH's 3–5, elution at pH 6 is nearly complete, whilst elution at pH's 7 and 8.8 is complete.

*Example 8.—The elution of chick interferon from Doucil-adsorbates at various pH's*

This experiment was carried out as described in Example 8, but 4 mg./ml. of Doucil were used.

The results are shown in Table IX.

TABLE IX

| | Percent reduction of plaque numbers at a dilution of— | | | ug./ml. | Percent |
|---|---|---|---|---|---|
| | 1/8 | 1/24 | 1/2 | | |
| Starting Fluid | 96 | 22 | 0 | 816 | "100" |
| Supernatant | 0 | 0 | 0 | 50 | 6 |
| Elution with 0.7 M acetate buffer pH 3 | 0 | 0 | 0 | 3 | <1 |
| Elution with 0.7 acetate buffer pH 4 | 0 | 0 | 0 | 3 | <1 |
| Elution with 0.7 M acetate buffer pH 5 | 9 | 26 | 0 | 44 | 5 |
| Elution with 0.7 M phosphate buffer pH 6 | 87 | 43 | 26 | 271 | 33 |
| Elution with 0.7 M phosphate buffer pH 7 | 87 | 48 | 9 | 295 | 36 |
| Elution with 0.7 M phopshate buffer pH 8 | 91 | 43 | 26 | 302 | 37 |
| Elution with 0.7 M Na₂HPO₄ buffer pH 8.8 | 74 | 39 | 22 | 262 | 32 |

The results show that very little or no interferon was eluated at pH's 3–5 even when high molarity solutions were used, whilst elution at pH's 6–8.8 is substantially complete.

No activity could be eluted at pH 3–5 when 0.7 M acetate buffers were replaced by 0.7 M phosphate buffers, showing that the nature of the anion is not of great significance in elution.

*Example 9.—Adsorption of monkey interferon by high levels of Doucil and attempted elutions*

The experimental conditions were similar to those of Example 6, but 10 and 50 mg./ml. Doucil were used instead of 0.5 mg./ml. Elutions were attempted with 0.7 M phosphate buffer of pH 7.5, using in one series 1/5 the starting volume and in another series a volume equal to the starting volume.

Results are shown in Table X.

TABLE X

| | Protection at a dilution of— | Approx. percent interferon |
|---|---|---|
| Starting Fluid | 1/24 | "100" |
| Supernatant from adsorption with 10 mg./ml. Doucil at: | | |
| pH 5 | <1/4 | <17 |
| pH 6 | 1/4 | <17 |
| pH 7 | 1/20 | 83 |
| pH 8 | 1/16 | 67 |
| Supernatant from adsorption with 50 mg./ml. Doucil at: | | |
| pH 5 | <1/4 | <17 |
| pH 6 | <1/4 | <17 |
| pH 7 | <1/4 | <17 |
| pH 8 | <1/4 | <17 |
| Elutions from the above adsorbates, using in one series 1/5 the starting volume of 0.7 M phosphate buffer at pH 7.5, in another series volumes equal to the starting volumes | <1/4 | <17 |

The results show that interferon can be adsorbed at high pH's if much higher concentrations of Doucil are used. Interferon adsorbed by these high levels of Doucil could not be eluted even when strong phosphate buffer in a volume equal to the starting volume was used.

We claim:

1. A process for the purification and/or concentration of material containing interferon comprising adsorbing said interferon at a pH less than 6 from an aqueous medium onto at least one fine particulate alumino-silicate adsorbent having a molar ratio of $SiO_2$ to $Al_2O_3$ greater than 5.

2. A process as claimed in claim 1 in which the alumino-silicate contains alkali metal oxide in combined form.

3. A process as claimed in claim 1 in which the average particle size of the adsorbent is below $50\mu$.

4. A process as claimed in claim 1 in which the pH of the aqueous solution containing the interferon prior to adsorption is between 3 and 5.

5. A process as claimed in claim 1 in which the weight ratio of adsorbent to protein in the interferon-containing solution is between 3:1 and 20:1.

6. A process according to claim 1 in which the interferon is eluted from said adsorbate by means of an aqueous solution of an electrolyte selected from the group consisting of an acid, a base and a salt, said solution being at a pH greater than 5.5, but less than 11.0.

7. A process as claimed in claim 6 in which the eluant is an aqueous alkaline solution.

References Cited by the Examiner

Burke: Biochem. Journal, vol. 78, pp. 556–563, March 1961.

Chemical Abstracts, vol. 53, entry 3858i–3859b, 1959, citing Nanobashvili et al., Trudy Inst. Khim, im P.G. Melikishvili Akad. Nauk Gruzin, 13.

Lindemann et. al.: British Journal of Experimental Pathology, vol. 38, pp. 551–562 (especially p. 558), October 1957.

LEWIS GOTTS, *Primary Examiner.*

R. L. HUFF, *Assistant Examiner.*